(12) United States Patent
Bose et al.

(10) Patent No.: US 12,184,077 B2
(45) Date of Patent: Dec. 31, 2024

(54) CONVERTIBLE TRANSFER SWITCH

(71) Applicant: ABB Schweiz AG, Baden (CH)

(72) Inventors: Veerakumar Bose, Richmond, VA (US); Thomas Anthony Kendzia, III, Richmond, VA (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/047,842

(22) Filed: Oct. 19, 2022

(65) Prior Publication Data

US 2024/0136824 A1  Apr. 25, 2024
US 2024/0235210 A9  Jul. 11, 2024

(51) Int. Cl.
*H02J 3/38* (2006.01)
*H02J 3/00* (2006.01)
*H02J 3/44* (2006.01)

(52) U.S. Cl.
CPC ............ *H02J 3/388* (2020.01); *H02J 3/0012* (2020.01); *H02J 3/007* (2020.01); *H02J 3/44* (2013.01)

(58) Field of Classification Search
CPC .......... H02J 3/388; H02J 3/0012; H02J 3/007; H02J 3/44
USPC ........................................................ 307/86
See application file for complete search history.

(56) References Cited

U.S. PATENT DOCUMENTS

| | | | | |
|---|---|---|---|---|
| 3,942,028 A | * | 3/1976 | Baker | H02J 9/06 307/66 |
| 5,386,147 A | * | 1/1995 | Bonneau | H02J 9/061 307/64 |
| 10,903,649 B1 | * | 1/2021 | Oudrhiri | H02J 9/062 |
| 2018/0034278 A1 | * | 2/2018 | Novak | H02J 3/38 |
| 2022/0261026 A1 | * | 8/2022 | Karlgaard | H02J 3/14 |

FOREIGN PATENT DOCUMENTS

EP    4002693 A1    5/2022
WO    2015020868 A1    2/2015

* cited by examiner

*Primary Examiner* — Richard Tan
(74) *Attorney, Agent, or Firm* — Greenberg Traurig, LLP (57) ABSTRACT

A system and a method for connecting electrical load(s) to a first power source and a second power source including a switching device and a controller. The switching device includes a first semiconductor device pair and a second semiconductor device pair. The controller configured to receive a first set of electronic signals corresponding to a condition of the first power source and the second power source, isolate the first power source or the second power source from the one or more loads by transmitting a first set of control signals to the switching device, receive a second set of electronic signals corresponding to the condition of the first power source and the second power source, and connect the first power source or the second power source to the one or more loads by transmitting a second set of control signals to the switching device.

17 Claims, 4 Drawing Sheets

CONVERTIBLE TRANSFER SWITCH

FIELD

The present disclosure relates to the field of switching devices. More particularly, to semiconductor switching devices, for example, for connecting a load to a power source and a distributed generation power source.

BACKGROUND

Switching devices are typically used to connect/disconnect one or more power sources and electrical load(s). Microgrids typically include switching device(s) to connect a variety of electrical loads to a main grid power source (i.e., main power grid) in a "grid-connected mode" and a distributed generation power source in an "off-grid mode" or "islanded mode." Conventional grid-tied switching devices can isolate the electrical loads from a faulty main power source while the distributed generation power source remains connected to the electrical load(s) to ensure an uninterrupted power supply. However, conventional grid-tied switching devices are limited and lack flexibility for connecting the electrical load(s) to the respective power sources. Furthermore, although conventional static transfer switches may be used to alternate connection between different power sources, static transfer switches cannot connect the electrical loads to both power sources simultaneously. Thus, improved switching devices are desirable.

SUMMARY

In some embodiments, a system includes a switching device configured to connect one or more loads to a first power source and a second power source, the switching device including a first semiconductor device pair, a second semiconductor device pair, and a controller electrically communicable with the switching device and configured to receive a first set of electronic signals corresponding to a condition of the first power source and the second power source, isolate the first power source or the second power source from the one or more loads by transmitting a first set of control signals to the switching device, the first set of control signals based on determining a fault condition at either the first power source or the second power source, receive a second set of electronic signals corresponding to the condition of the first power source and the second power source, and connect the first power source or the second power source to the one or more loads by transmitting a second set of control signals to the switching device, the second set of control signals based on determining a clearing of the fault condition at the first power source or the second power source.

In some embodiments, isolating the first power source or the second power source from the one or more loads by transmitting a first set of control signals to the switching device further includes: control a switching operation of the first semiconductor device pair and the second semiconductor device pair to isolate the one or more loads from the first power source or the second power source in response to the first set of control signals, wherein the first set of control signals is configured to operate the switching device in a static transfer switching mode.

In some embodiments, connecting the first power source or the second power source to the one or more loads by transmitting a second set of control signals to the switching device further includes: control a switching operation of the first semiconductor device pair and the second semiconductor device pair to connect the one or more loads to the isolated first power source or isolated second power source in response to the second set of control signals; wherein the second set of control signals is configured to operate the switching device in a grid-tied switching mode.

In some embodiments, each of the first set of electronic signals and the second set of electronic signals include a voltage, frequency, and/or phase angle of the first power source and the second power source.

In some embodiments, the controller is further configured to determine the voltage, frequency, and/or phase of an isolated first power source or an isolated second power source is synchronized with an other of the first power source and second power source, wherein the isolated first power source or isolated second power source is connected to the one or more loads and the other of the first power source and the second power source when the voltage, frequency, and/or phase angle of the isolated first power source or isolated second power source is within a predetermined range of the voltage, frequency, and/or phase angle of the other of the first power source and the second power source.

In some embodiments, the controller is further configured to align the first semiconductor device pair and the second semiconductor device pair to connect the second power source to the one or more loads and the first power source, wherein the first power source receives power from the second power source that exceeds a requirement of the one or more loads.

In some embodiments, the first semiconductor device pair includes a first semiconductor device and a second semiconductor device arranged in an anti-parallel configuration; wherein the second semiconductor device pair includes a third semiconductor device and a fourth semiconductor device arranged in an anti-parallel configuration.

In some embodiments, each semiconductor device of the first semiconductor device pair and the second semiconductor device pair includes a thyristor.

In some embodiments, the switching device further includes one or more switches, wherein the one or more switches are configured to electrically isolate and bypass the first semiconductor device pair and the second semiconductor device pair.

In some embodiments, the switching device further includes a first switch disposed between the first power source and the first semiconductor device pair, a second switch disposed between the second power source and the second semiconductor device pair, and a common node connecting the first semiconductor device pair and the second semiconductor device pair to the one or more loads.

In some embodiments, the switching device further includes a third switch disposed between the common node and the one or more loads, a fourth switch disposed between the common node and the one or more loads parallel to the third switch, a fifth switch disposed between the first power source and the one or more loads, and a sixth switch disposed between the second power source and the one or more loads.

In some embodiments, a method includes receiving a first set of electronic signals corresponding to a condition of a first power source and a second power source; isolating the first power source or the second power source from one or more loads by transmitting a first set of control signals to a switching device, the first set of control signals based on determining a fault condition at either the first power source or the second power source; receiving a second set of electronic signals corresponding to the condition of the first power source and the second power source; and connecting the first power source or the second power source to the one or more loads by transmitting a second set of control signals to the switching device, the second set of control signals based on determining a clearing of the fault condition at the first power source or the second power source.

In some embodiments, the method includes isolating the first power source or the second power source from the one or more loads by transmitting a first set of control signals to the switching device further includes: controlling, by the controller, a switching operation of a first semiconductor device pair and a second semiconductor device pair to isolate the one or more loads from the first power source or the second power source in response to the first set of control signals, wherein the first set of control signals is configured to operate the switching device in a static transfer switching mode.

In some embodiments, connecting the first power source or the second power source to the one or more loads by transmitting a second set of control signals to the switching device further includes controlling, by the controller, a switching operation of a first semiconductor device pair and a second semiconductor device pair to connect the one or more loads to an isolated first power source or isolated second power source in response to the second set of control signals, wherein the second set of control signals is configured to operate the switching device in a grid-tied switching mode.

In some embodiments, the method further includes determining a voltage, frequency, and/or phase of an isolated first power source or an isolated second power source is synchronized with an other of the first power source and second power source; and wherein each of the first set of electronic signals and the second set of electronic signals includes the voltage, frequency, and/or phase angle of the first power source and the second power source; wherein the isolated first power source or isolated second power source is connected to the one or more loads and the other of the first power source and the second power source when the voltage, frequency, and/or phase angle of the isolated power source is within a predetermined range of the voltage, frequency, and/or phase angle of the other power source.

In some embodiments, the method further includes aligning, by the controller, a first semiconductor device pair and a second semiconductor device pair of the switching device to connect the second power source to the one or more loads and the first power source; wherein the first power source receives power from the second power source that exceeds a requirement of the one or more loads.

In some embodiments, a controller electrically communicable with a switching device, the switching device including a first semiconductor device pair and a second semiconductor device pair, the controller including a processor configured to receive a first set of electronic signals corresponding to a condition of a first power source and a second power source; isolate the first power source or the second power source from one or more loads by transmitting a first set of control signals to the switching device, the first set of control signals based on determining a fault condition at either the first power source or the second power source; receive a second set of electronic signals corresponding to the condition of the first power source and the second power source; connect the first power source or the second power source to the one or more loads by transmitting a second set of control signals to the switching device, the second set of control signals based on determining a clearing of the fault condition at the first power source or the second power source; and wherein each of the first set of electronic signals and the second set of electronic signals include a voltage, frequency, and/or phase angle of the first power source and the second power source; wherein the isolated first power source or isolated second power source is connected to the one or more loads and the other of the first power source and the second power source when the voltage, frequency, and/or phase angle of the isolated power source is within a predetermined range of the voltage, frequency, and/or phase angle of the other power source.

In some embodiments, the controller is further configured to control a switching operation of the first semiconductor device pair and the second semiconductor device pair to isolate the one or more loads from the first power source or the second power source in response to the first set of control signals, wherein the first set of control signals is configured to operate the switching device in a static transfer switching mode.

In some embodiments, the controller is further configured to control a switching operation of the first semiconductor device pair and the second semiconductor device pair to connect the one or more loads to the isolated first power source or isolated second power source in response to the second set of control signals; wherein the second set of control signals is configured to operate the switching device in a grid-tied switching mode.

In some embodiments, the controller is further configured to align the first semiconductor device pair and the second semiconductor device pair to connect the second power source to the one or more loads and the first power source, wherein the first power source receives power from the second power source that exceeds a requirement of the one or more loads.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

Like reference numbers represent the same or similar parts throughout.

DETAILED DESCRIPTION

Grid-tied switching devices in microgrids, which are known in the prior art, connect a main power source (i.e., main power grid, utility grid, etc.) and a distributed generation ("DG") power source to electrical load(s), and can disconnect (isolate) the main power source from the electrical load(s) in case of a fault or other transient. The grid-tied switching device may be a semiconductor switching device, including a semiconductor device pair in an anti-parallel configuration. In case of a fault at the main power source, grid-tied switching device isolates the load(s) from the main power source. Conventional grid-tied switching device, however, cannot isolate the load from the DG power source. Although the grid-tied switches may include other switching devices (i.e., circuit breakers) to isolate the DG power source from the one or more loads, operation of the grid-tied switches can be inefficient and cannot switch between power sources.

Alternatively, microgrids can include static transfer switching devices to switch between the main power source or the DG power source. However, conventional static transfer switching devices cannot connect the electrical load(s) to both power sources simultaneously, but rather switch between the main power source or the DG power source.

A convertible grid-tied switching device described herein can connect an electrical load(s) to a main power source and a DG power source. Furthermore, the convertible grid-tied switching device can be configured to isolate each of the main power source and the DG power source from the electrical load(s) in case of a fault or other transient at either the main power source or the DG power source. In certain embodiments, a controller can be electrically communicable with the convertible grid-tied switching device and can include one or more processors and a non-transitory computer readable medium having instructions stored thereon executable by the one or more processors to control the operation of the convertible grid-tied switching device. In some embodiments, the instructions stored on the non-transitory computer readable medium can include an algorithm capable of meeting both Static transfer Switch and Grid connected system functionality by controlling a switching operation of each switch of the convertible grid-tied switching device. The algorithm can control the convertible grid-tied switching device to connect the electrical load(s) to both the main power source and the DG power source, similar to the conventional grid-tied switch, and can individually connect the electrical load(s) to either the main power source or the DG power source, similar to the conventional static transfer switch, to isolate the power source based on detecting a fault at the power source.

Figure 1:
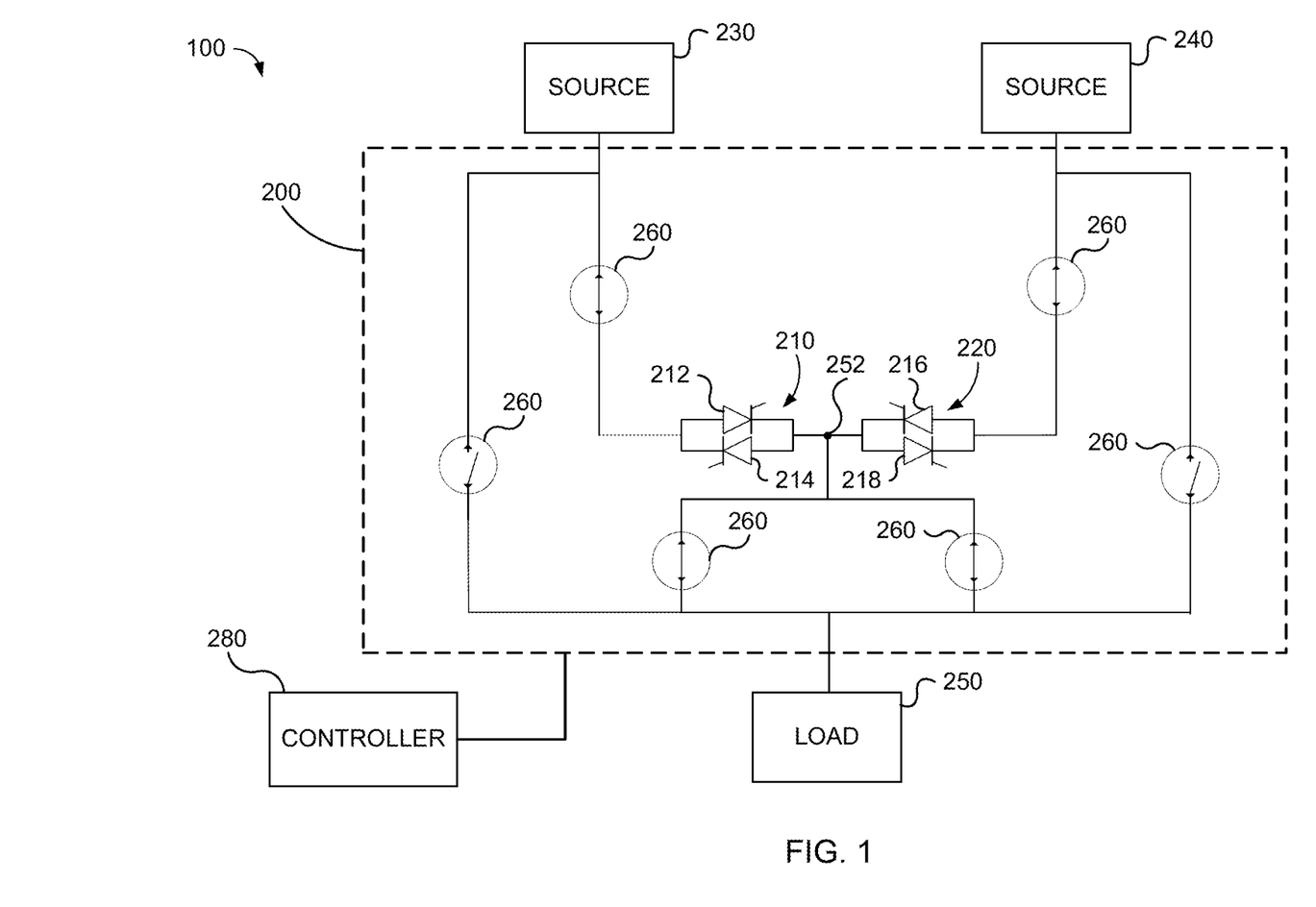
FIG. 1 is a schematic illustrating a system including a switching device connecting a load to a first power source and a second power source, according to some embodiments.
Figure 2:
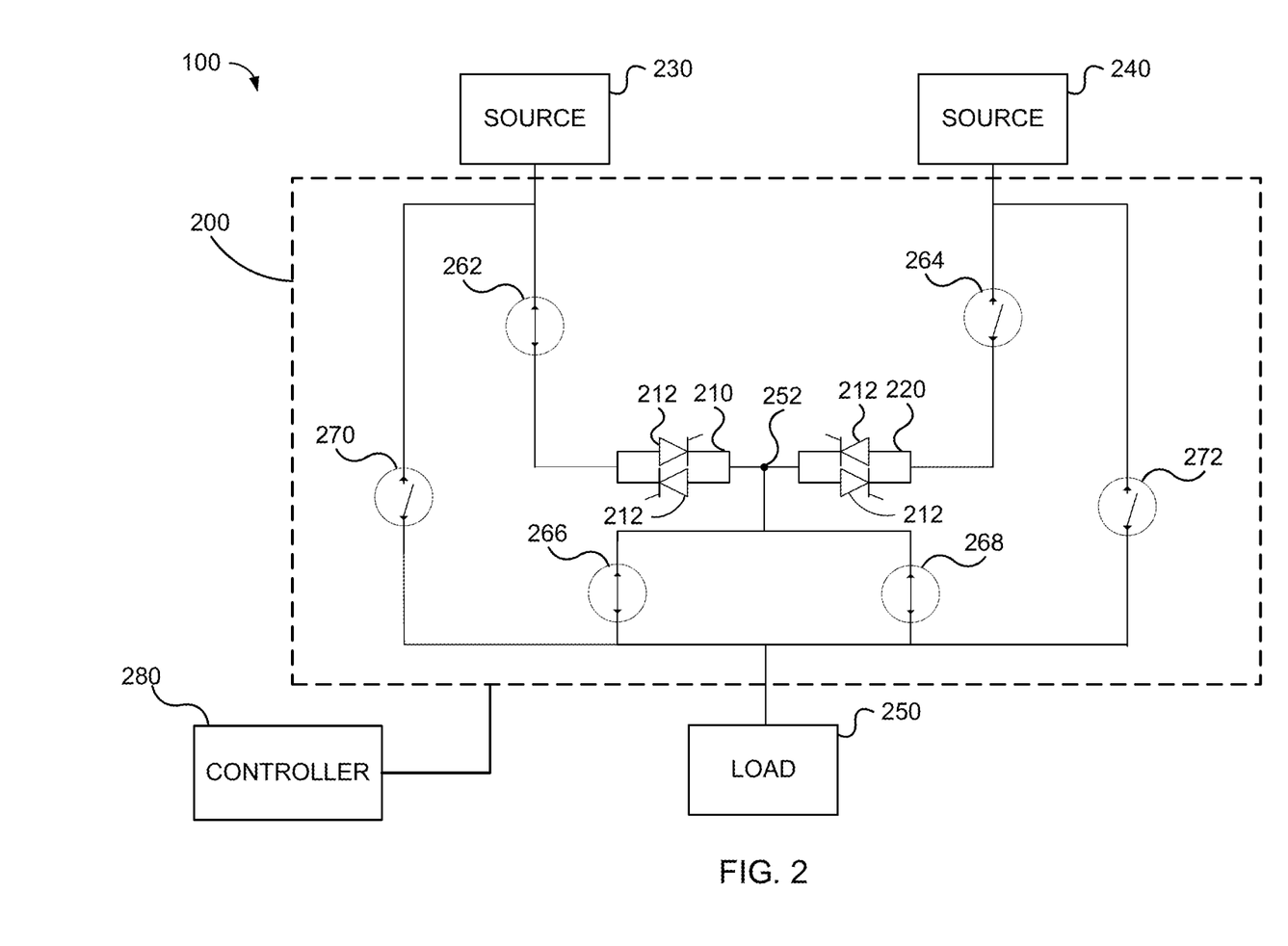
FIG. 2 is a schematic illustrating the system including the switching device connecting the load to the first power source, according to some embodiments.
Figure 3:
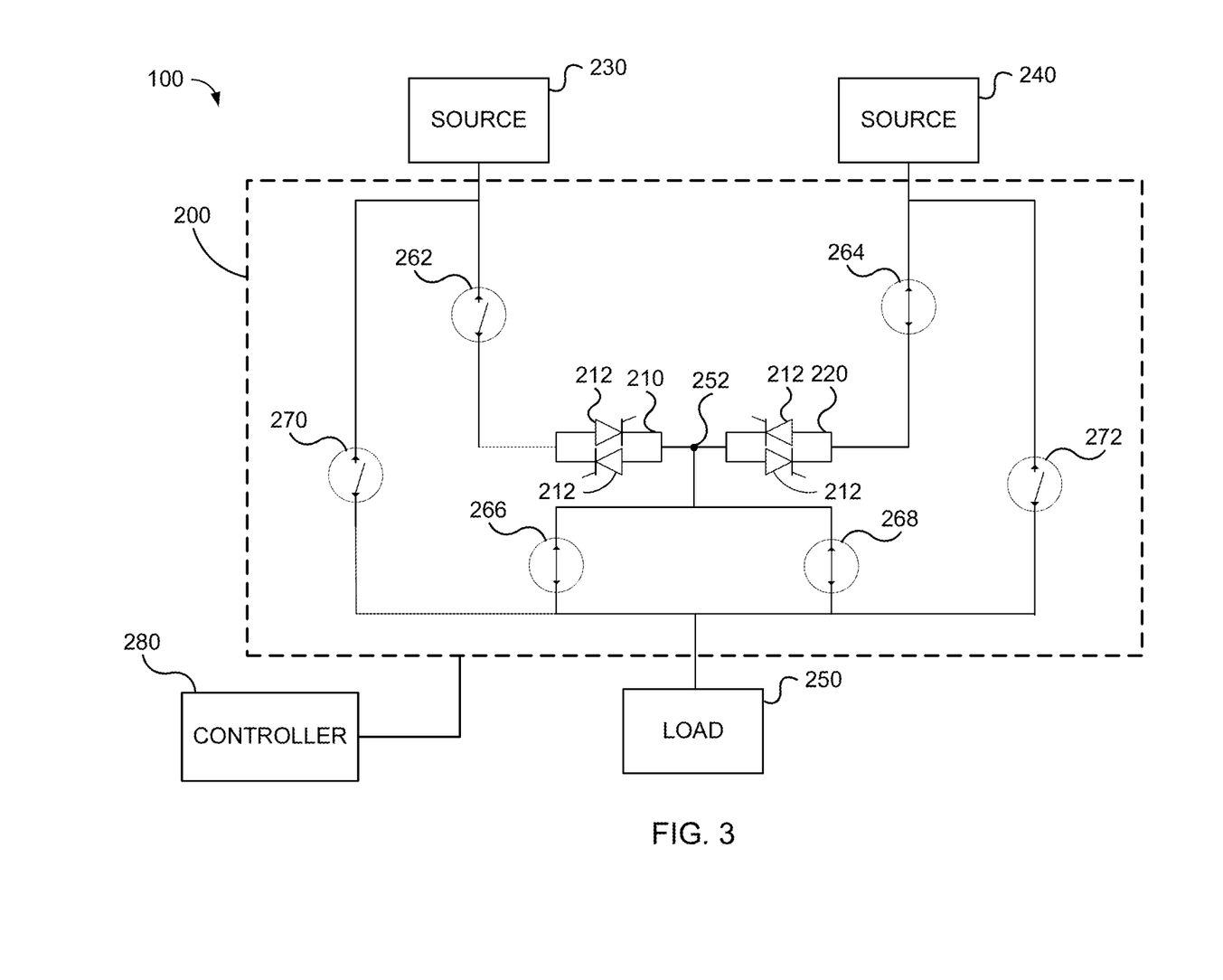
FIG. 3 is a schematic illustrating the system including the switching device connecting the load to the second power source, according to some embodiments.

FIG. 1 is a schematic illustrating a system 100 including a switching device 200 connecting a load 250 to a first power source 230 and a second power source 240, according to some embodiments. FIG. 2 is a schematic illustrating the system 100 including the switching device 200 connecting the load 250 to the first power source 230, according to some embodiments. FIG. 3 is a schematic illustrating the system 100 including the switching device 200 connecting the load 250 to the second power source 240, according to some embodiments. Unless noted otherwise, FIGS. 1-3 will be described collectively.

The switching device 200 includes a first semiconductor device pair 210 and a second semiconductor device pair 220. The switching device 200 may also be called a convertible grid switch, convertible grid-tied switch, or the like. In some embodiments, the first semiconductor device pair 210 and a second semiconductor device pair 220 of the switching device 200 may connect a first power source 230 and a second power source 240 to a load 250. In some embodiments, the first power source 230 may be a grid power source. In some embodiments, the second power source 240 may be a distributed generation power source. In some embodiments, the load 250 may include one or more loads 250.

In some embodiments, the second power source 240 may be a renewable energy source including, but is not limited to, solar panel plants, wind turbine plants, combined heat and power systems, marine energy generation systems, geothermal or biomass energy generation systems, solar generation, diesel generation, fuel cells, other renewable power sources, and combinations thereof.

The switching device 200 includes the first semiconductor device pair 210. In some embodiments, the first semiconductor device pair 210 may include a first semiconductor device 212 and a second semiconductor device 214. In some embodiments, the first semiconductor device 212 and the second semiconductor device 214 may be arranged in an anti-parallel configuration. In some embodiments, the switching of the first semiconductor device 212 and the second semiconductor device 214 may be controlled to connect or disconnect the first power source 230 from the one or more loads 250 and the second power source 240.

The first semiconductor device pair 210 connects and disconnects the first power source 230 to the one or more loads 250. In some embodiments, the first semiconductor device pair 210 may be aligned to connect the first power source 230 to a common node 252. In some embodiments, the first semiconductor device pair 210 may be aligned to electrically connect the first power source 230 to both the second power source 240 and the one or more loads 250.

The switching device 200 includes the second semiconductor device pair 220. In some embodiments, the second semiconductor device pair 220 may include a third semiconductor device 216 and a fourth semiconductor device 218. In some embodiments, the third semiconductor device 216 and the fourth semiconductor device 218 may be arranged in an anti-parallel configuration. In some embodiments, the switching of the third semiconductor device 216 and the fourth semiconductor device 218 may be controlled to connect or disconnect the second power source 240 from the one or more loads 250 and the first power source 230.

The second semiconductor device pair 220 connects and disconnects the second power source 240 to the one or more loads 250. In some embodiments, the first semiconductor device pair 210 may be aligned to electrically connect the second power source 240 to the first power source 230 and the one or more loads 250. In some embodiments, the first semiconductor device pair 210 and the second semiconductor device pair 220 may be aligned to connect the second power source 240 to the one or more loads 250 and the first power source 230 to transfer a power generated by the second power source 240 that exceeds a demand by the one or more loads 250 to the first power source 230. The first power source 230 may receive the excess power from the second power source 240 and store the power at the first power source 230 and/or distribute it to other loads connected to the first power source 230, such as other microgrids connected to the first power source 230. In some embodiments, the second semiconductor device pair 220 may connect the second power source 240 to the common node 252.

In some embodiments, the first semiconductor device pair 210 and the second semiconductor device pair 220 of the switching device 200 may simultaneously connect the first power source 230 and the second power source 240 to the load 250. In some embodiments, the first semiconductor device pair 210 and the second semiconductor device pair 220 of the switching device 200 may be configurable to connect the first power source 230 or the second power source 240 to the load 250. In some embodiments, the first semiconductor device pair 210 and the second semiconductor device pair 220 of the switching device 200 may be configurable to isolate the first power source 230 or the second power source 240 from the load 250 based on a fault at the first power source 230 or the second power source 240, respectively.

In some embodiments, the semiconductor devices of the switching device 200 may be thyristors, also known as a Silicon Control Rectifier (SCR). In other embodiments, the semiconductor devices of the switching device 200 may include silicon carbide (SiC) metal-oxide semiconductor field-effect transistors (MOSFETs). In another embodiment, the semiconductor devices of the switching device 200 may include insulated gate bipolar transistor (IGBT). In another embodiment, the semiconductor devices of the switching device 200 may include gallium nitride (GaN) field-effect transistor (FET), a high-electron-mobility-transistor (HEMT), a SiC junction gate field-effect transistor (JFET), a GaN JFET, or a bipolar junction transistor (BJT), or other transistor.

In some embodiments, the switching device 200 may include a common node 252. In some embodiments, the common node 252 may be located between the first semiconductor device pair 210 and the second semiconductor device pair 220. In some embodiments, the common node 252 may connect the first semiconductor device pair 210 and the second semiconductor device pair 220 to the one or more loads 250.

Referring to FIG. 1, in some embodiments, the switching device 200 may include switches 260. In some embodiments, the switches 260 may be a mechanical and/or electrical contact point switch. In some embodiments, the switches 260 may be a circuit breaker. The switches 260 may provide additional isolation protection to the switching device 200 and may be operated when connecting the first power source 230 and the second power source 240 to the one or more loads 250 using the first semiconductor device pair 210 and the second semiconductor device pair 220, respectively. In some embodiments, the switches 260 may bypass the first semiconductor device pair 210 and the second semiconductor device pair 220.

In some embodiments, the switching device 200 may be configured to connect the first power source 230 and the second power source 240 to the one or more loads 250. In some embodiments, the switching device 200 may be further configured to connect the first power source 230 to the one or more loads 250 and isolate the second power source 240 from the one or more loads 250. In some embodiments, the switching device 200 may be further configured to connect the second power source 240 to the one or more loads 250 and isolate the first power source 230 from the one or more loads 250. In some embodiments, the switching device 200 may be configured to connect the second power source 240 to the one or more loads 250 and the first power source 230. Consequently, in some embodiments, the second power source 240 may provide power to the one or more loads 250 and any excess power may be transferred to the first power source 230 for energy storage purposes or to power other loads connected to the first power source 230. In some embodiments, the switching device 200 may be configured to isolate the first power source 230, the second power source 240, or both the first power source 230 and the second power source 240 from the one or more loads 250.

In some embodiments, the system 100 may include a controller 280. In some embodiments, the controller 280 may include one or more processors and a non-transitory computer readable medium. In some embodiments, the computer readable medium may include stored thereon instructions executable by the processor and the controller 280 may be electrically communicable with the switching device 200, as will be further discussed herein.

In some embodiments, the controller 280 may be configured to operate the first semiconductor device pair 210 and the second semiconductor device pair 220. The controller 280 may transmit control signals to the switching device 200 to operate the first semiconductor device pair 210 and the second semiconductor device pair 220 to configure the switching device 200 based on the signals received by the controller 280. In some embodiments, the controller 280 can control the first semiconductor device pair 210 and the second semiconductor device pair 220 to isolate or connect the first power source 230 and the second power source 240 to the one or more loads 250. The controller 280 is configured to receive electronic signals from the first power source 230 and the second power source 240. In some embodiments, the electronic signals from the first power source 230 and the second power source 240 correspond to a condition of the first power source 230 and the second power source 240. In some embodiments, the electronic signals may include a first set of signals and a second set of signals.

In some embodiments, the first set of signals may be a first set of electronic signals. In some embodiments, the first set of signals may include data corresponding to a condition of each of the first power source 230 and the second power source 240. In some embodiments, the first set of signals may include data corresponding to a fault condition at each of the first power source 230 and the second power source 240. In some embodiments, the first set of signals may include data corresponding to a voltage, frequency, and/or phase angle of the first power source 230 and the second power source 240. In some embodiments, the controller 280 may receive the first set of signals and determine a fault condition exists at the first power source 230, the second power source 240, or both. In some embodiments, determining the fault condition exists at the first power source 230, the second power source 240, or both may include determining the voltage, frequency, and/or phase angle of the first power source 230 and the second power source 240 exceeded a range. In some embodiments, the range may include a predetermined range. In some embodiments, the range may be defined by a user.

In some embodiments, determining a fault condition may include comparing the first set of signals to data stored in a data store corresponding to historical data of the first power source 230 and the second power source 240 during a normal operating condition. In some embodiments, determining a fault condition may include determining one or more vectors corresponding to the voltage, frequency, and/or phase angle of the first power source 230 and the second power source 240 at a first period of time and a second period of time after the first period of time and determining a fault condition based on the one or more vectors.

In some embodiments, the controller 280 may transmit a first set of control signals to the switching device 200 to isolate (i.e., disconnect) the first power source 230 or the second power source 240 from the one or more loads 250 based on determining a fault condition at the first power source 230 or the second power source 240. In some embodiments, the controller 280 may transmit the first set of control signals based on the first set of signals. In some embodiments, the first set of control signals may operate the switches 260 to isolate the first power source 230 or the second power source 240 from the one or more loads 250 based on the controller 280 determining a fault condition exists at either the first power source 230 or the second power source 240. In some embodiments, the first set of control signals may operate each of the first semiconductor device pair 210 and the second semiconductor device pair 220.

In some embodiments, the controller 280 may receive a second set of electronic signals corresponding to the condition of the first power source 230 and the second power source 240. In some embodiments, the second set of signals may be a second set of electronic signals. In some embodiments, the second set of signals may include data corresponding to the condition of each of the first power source 230 and the second power source 240. In some embodiments, the second set of signals may include data corresponding to a clearing of the fault condition at each of the first power source 230 and the second power source 240. In some embodiments, the second set of signals may further include data corresponding to the voltage, frequency, and/or phase angle of each of the first power source 230 and the second power source 240. In some embodiments, an isolated first power source 230 or second power source 240 may be connected to the one or more loads 250 and the other of the first power source 230 and the second power source 240 when the voltage, frequency, and/or phase angle of the isolated power source is within range of the voltage, frequency, and/or phase angle of the other power source. In some embodiments, the range may be a predetermined range. In some embodiments, the range may be defined by a user.

In some embodiments, the controller 280 may receive the second set of signals and determine the fault condition has cleared at the first power source 230, the second power source 240, or both. In some embodiments, determining the clearing of the fault condition may include comparing the second set of signals to the first set of signals. In some embodiments, the second set of signals may be compared to data stored in the data store corresponding to historical data of the first power source 230 and the second power source 240 during a normal operating condition. In some embodiments, determining the clearing of the fault condition may include determining one or more vectors corresponding to the voltage, frequency, and/or phase angle of the first power source 230 and the second power source 240 at a third period of time and a fourth period of time after the third period of time and determining the fault condition has cleared based on the one or more vectors.

In some embodiments, the controller 280 may transmit a second set of control signals to the switching device 200 to connect the first power source 230 or the second power source 240 to the one or more loads 250 based on determining a clearing of the fault condition at the first power source 230 or the second power source 240. In some embodiments, the controller 280 may transmit the second set of control signals based on the second set of signals. In some embodiments, the second set of control signals may operate the switches 260 to connect (i.e., reconnect) the first power source 230 or the second power source 240 to the one or more loads 250 and the other of the first power source 230 and the second power source 240 based on the controller 280 determining the fault condition has cleared at either the first power source 230 or the second power source 240. In some embodiments, the first set of control signals may operate each of the first semiconductor device pair 210 and the second semiconductor device pair 220.

In some embodiments, the controller 280 may receive the electronic signals corresponding to the voltage, frequency, and/or phase angle of each of the first power source 230 and the second power source 240. In some embodiments, the controller 280 may connect the isolated first power source 230 or isolated second power source 240 to the other of the first power source 230 and the second power source 240 when the isolated (i.e., disconnected) power source is in phase with the other power source by controlling an operation of the first semiconductor device pair 210 and the second semiconductor device pair 220. Consequently, in certain embodiments, the controller 280 may connect the isolated first power source 230 or the second power source 240 when the voltage, frequency, and/or phase angle of the isolated first power source 230 or isolated second power source 240 is synchronous (i.e., in phase) with the voltage, frequency, and/or phase angle of the other of the first power source 230 and the second power source 240 connected to the one or more loads 250. In some embodiments, the controller 280 may connect the isolated first power source 230 or the second power source 240 when the voltage, frequency, and/or phase angle of the isolated first power source 230 or isolated second power source 240 is within a predetermined range of the voltage, frequency, and/or phase angle of the other of the first power source 230 and the second power source 240 connected to the one or more loads 250.

In some embodiments, the controller 280 may further include an algorithm stored in the computer readable medium. In some embodiments, the algorithm may include instructions executable by the one or more processors of the controller 280 to receive electronic signals from the first power source 230 and the second power source 240 corresponding to the voltage, frequency, and/or phase angle of each of the first power source 230 and the second power source 240 and to control the switches 260 to reconnect the isolated first power source 230 or the second power source 240 when in synchronous phase with the other of the first power source 230 and the second power source 240 connected to the one or more loads 250. In some embodiments, the controller 280 may control the switches 260 to reconnect the isolated first power source 230 or the second power source 240 when within a predetermined voltage, frequency, and/or phase angle range with the other of the first power source 230 and the second power source 240 connected to the one or more loads 250.

In some embodiments, the tolerance for connecting the first power source 230 or the second power source 240 to the other power source connected to the one or more loads 250 may be defined by a user. In some embodiments, the controller 280 may be configured to connect the isolated power source to the one or more loads 250 and the other power source in less than 6 msec. In some embodiments, the controller 280 may be configured to connect the isolated power source to the one or more loads 250 and the other power source in less than 4 msec. In some embodiments, the controller 280 may be configured to connect the isolated power source to the one or more loads 250 and the other power source in a range from 2 to 4 msec. In some embodiments, the controller 280 may be configured to connect the isolated power source to the one or more loads 250 and the other power source in a range from 2 to 3 msec. In some embodiments, the controller 280 may be configured to connect the isolated power source to the one or more loads 250 and the other power source in 2 msec or less.

In some embodiments, the controller 280 may be further configured to control each of the switches 260. In some embodiments, the controller 280 may be configured to control the first switch 262, the second switch 264, the third switch 266, the fourth switch 268, the fifth switch 270, and the sixth switch 272. For example, in certain embodiments, the controller 280 may open the first switch 262 and close the fifth switch 270 to bypass the first semiconductor device pair 210.

In some embodiments, the system 100 may further include one or more sensing devices. Each of the sensing devices may be electronically communicable with the switching device 200 and/or the controller 280 to provide electronic signals corresponding to values detected by the sensing devices. In some embodiments, each of the sensing devices may monitor any of a plurality of features including, but not limited to, voltage, current, frequency, vibration, temperature, other features, and combinations thereof. In some embodiments, the controller 280 may be electrically communicable with each of the sensing devices to receive signals corresponding to the voltage, current, frequency, temperature, vibration, etc., from each of the sensing devices.

In some embodiments, the switching device 200 may further include a processor and a non-transitory computer-readable medium. In some embodiments, the controller 280 may include the processor and the computer-readable medium. In some embodiments, the switching device 200 may include the controller 280. In some embodiments, the computer readable medium may include software stored thereon. In some embodiments, the software may include the algorithm including instructions to operate the switching device 200 based on the signals received by the controller 280. Further, in some embodiments, the controller 280 may be configured to receive signal inputs from the one or more sensing devices and any other external devices and operate the switching device 200 to provide uninterrupted power to the one or more loads 250 from the first power source 230 and the second power source 240. In some embodiments, the controller 280 and/or the algorithm may be configured to operate the switching device 200 between a grid-tied mode and a static transfer mode. In some embodiments, in the grid-tied mode, the controller 280 may be configured to control the switching device 200 to connect the one or more loads 250 to the first power source 230 and the second power source 240. Further, in the static transfer mode, the controller 280 may be configured to control the switching device 200 to isolate the one or more loads 250 from the first power source 230 or the second power source 240 based on determining a fault at the first power source 230 or the second power source 240 and to connect the one or more loads 250 to the other of the first power source 230 and the second power source 240 to provide power to the one or more loads 250. Furthermore, once the fault condition has cleared, the controller 280 is further configured to reconnect the isolated power source to the one or more loads 250 by controlling the operation of the switching device 200. It is to be appreciated by those skilled in the art that the switching device 200 may further include any of a plurality of relays, switches, semiconductor devices, sensors, and other devices in accordance with this disclosure to connect the first power source 230 and/or the second power source 240 to the one or more loads 250 in accordance with this disclosure.

Referring to FIG. 2, in some embodiments, the switching device 200 may include a first switch 262 and a second switch 264. In some embodiments, the first switch 262 may be located between the first power source 230 and the first semiconductor device pair 210. The first switch 262 may be configured to isolate the first power source 230 from the switching device 200 and/or the one or more loads 250. In some embodiments, the first switch 262 may further isolate the first power source 230 from the second power source 240.

In some embodiments, the second switch 264 may be located between the second power source 240 and the second semiconductor device pair 220. The second switch 264 may be configured to isolate the second power source 240 from the switching device 200 and/or the one or more loads 250. In some embodiments, the second switch 264 may further isolate the second power source 240 from the first power source 230.

In some embodiments, the switching device 200 may include a third switch 266 and a fourth switch 268. In some embodiments, the third switch 266 may be located between the common node 252 and the one or more loads 250. The third switch 266 may be configured to isolate the one or more loads 250 from the second power source 240 and/or the first power source 230. In some embodiments, the fourth switch 268 may be located between the common node 252 and the one or more loads 250 parallel to the third switch 266. The fourth switch 268 may be configured to isolate the one or more loads 250 from the first power source 230 and/or the second power source 240.

In some embodiments, the switching device 200 may further include a fifth switch 270 and a sixth switch 272. In some embodiments, the fifth switch 270 may also be called a grid bypass switch. The fifth switch 270 may be configured to bypass the first semiconductor device pair 210 when bringing the first power source 230 online and connecting the first power source 230 to the one or more loads 250. In some embodiments, sixth switch 272 may also be called a DG bypass switch. The sixth switch 272 may be configured to bypass the second semiconductor device pair 220 when bringing the second power source 240 online and connecting the second power source 240 to the one or more loads 250.

In some embodiments, the fifth switch 270 and the sixth switch 272 may minimize the time to operate the first semiconductor device pair 210 and the second semiconductor device pair 220 to connect the one or more loads 250 to the first power source 230 and the second power source 240, respectively.

In some embodiments, each of the switches 260 may be configured to provide mechanical and/or electrical isolation in case of a fault on either side of the switches 260. For example, the first switch 262 and the fifth switch 270 may be opened to electrically isolate the first power source 230 from the one or more loads 250 to prevent damage to the one or more loads 250 if there is a ground fault at the first power source 230 and the first semiconductor device pair 210 is unresponsive.

In some embodiments, the one or more loads 250 may include one or more electrical loads. In some embodiments, the one or more loads 250 may include one or more devices, motors, pumps, batteries, or the like, that can receive power from the first power source 230 and/or the second power source 240 through the switching device 200.

Figure 4:
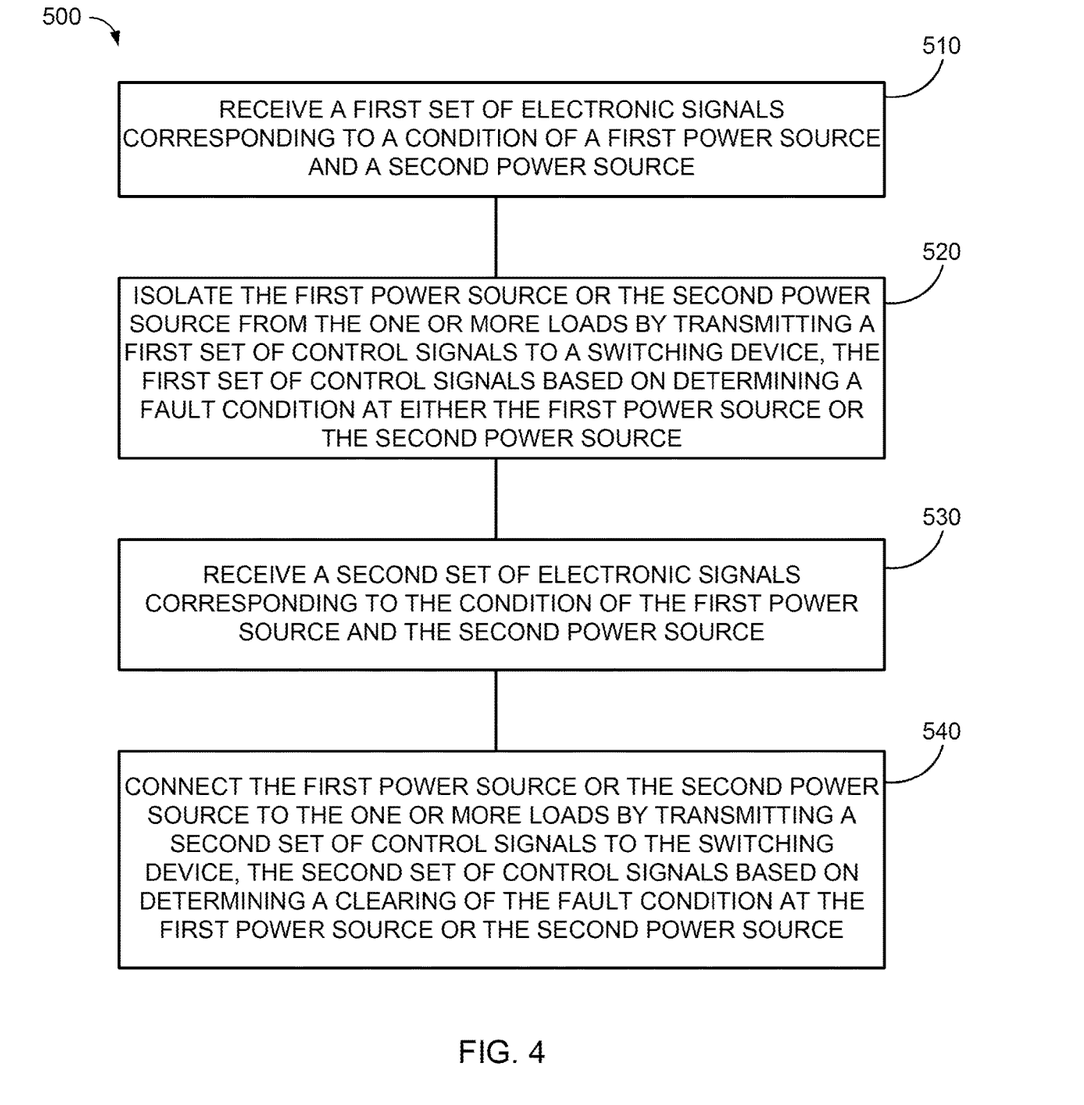
FIG. 4 illustrates a block diagram of a method, according to some embodiments.

FIG. 4 illustrates a block diagram of a method 500, according to some embodiments. At 510, the method 500 includes receiving a first set of signals corresponding to a condition of a first power source 230 and a second power source 240. In some embodiments, the first power source 230 and the second power source 240 may be connected to the one or more loads 250 through the switching device 200. In some embodiments, the first power source 230 and the second power source 240 may be providing power to the one or more loads 250 through the switching device 200. In some embodiments, the first set of signals may include a voltage, frequency, and/or phase angle of the first power source 230 and the second power source 240. In certain embodiments, the first set of signals may indicate a ground fault at the first power source 230, the second power source 240, or both. In some embodiments, the first set of signals may be a first set of electronic signals from the first power source 230 and the second power source 240.

In some embodiments, the first set of electronic signals may further include a vibration, a temperature, and other like signals indicating a condition of the first power source 230 and the second power source 240. In some embodiments, second set of electronic signals may include data corresponding to the condition of the first power source 230 and the second power source 240. In some embodiments, the condition may include, but is not limited to, a fault, ground fault, transient power surge, component failure, other abnormal conditions, and combinations thereof. Furthermore, in some embodiments, the first set of signals may be received from one or more sensing devices associated with the switching device 200, the first power source 230, the second power source 240, and combinations thereof.

At 520, the method 500 includes transmitting a first set of control signals to a convertible switch to isolating the first power source 230 or the second power source 240 from one or more loads 250 by transmitting a first set of control signals to a switching device 200, the first set of control signals based on determining a fault condition at either the first power source 230 or the second power source 240. In some embodiments, the isolating the first power source 230 or the second power source 240 from the one or more loads 250 by transmitting the first set of control signals to the switching device further includes controlling a switching operation of a first semiconductor device pair 210 and a second semiconductor device pair 220 to isolate the one or more loads 250 from the first power source 230 or the second power source 240 in response to the first set of control signals. In some embodiments, the first set of control signals is configured to operate the switching device 200 in a static transfer switching mode. In some embodiments, the method 500 further includes disconnecting the one or more loads 250 from the first power source 230 or the second power source 240 by operating a first semiconductor device pair 210 and a second semiconductor device pair 220 in response to the first set of control signals. In some embodiments, the controller 280 may transmit the first set of control signal to the first semiconductor device pair 210 and the second semiconductor device pair 220 to operate the first semiconductor device pair 210 and the second semiconductor device pair 220. In some embodiments, disconnecting the one or more loads 250 from the first power source 230 or the second power source 240 further includes operating the first semiconductor device pair 210 and the second semiconductor device pair 220 to isolate the first power source 230 or the second power source 240 from the one or more loads 250.

At 530, the method 500 includes receiving a second set of signals corresponding to the condition of the first power source 230 and the second power source 240. In some embodiments, the second set of signals may include a voltage, frequency, and/or phase angle of the first power source 230 and the second power source 240. In some embodiments, the second set of signals may be a second set of electronic signals from the first power source 230 and the second power source 240.

In some embodiments, the second set of electronic signals may further include a vibration, a temperature, and other like signals indicating a condition of the first power source 230 and the second power source 240. In some embodiments, second set of electronic signals may include data corresponding to a clearing of the condition of the first power source 230 and the second power source 240. In some embodiments, the condition may include, but is not limited to, a fault, ground fault, transient power surge, component failure, other abnormal conditions, and combinations thereof. Furthermore, in some embodiments, the second set of signals may be received from one or more sensing devices associated with the switching device 200, the first power source 230, the second power source 240, and combinations thereof.

In some embodiments, the method 500 may further include determining the voltage, frequency, and/or phase of an isolated first power source 230 or isolated second power source 240 is synchronized with the other of the first power source 230 and second power source 240. In some embodiments, the controller 280 may determine the first power source 230 and the second power source 240 are synchronized based on the second set of signals. In some embodiments, the isolated first power source 230 or isolated second power source 240 is reconnected to the one or more loads 250 and the other of the first power source 230 and the second power source 240 when the voltage, frequency, and/or phase angle of the isolated power source is synchronized with the voltage, frequency, and/or phase angle of the other power source.

At 540, the method 500 includes connecting the first power source 230 or the second power source 240 to the one or more loads 250 by transmitting a second set of control signals to the switching device 200, the second set of control signals based on determining a clearing of the fault condition at the first power source 230 or the second power source 240. In some embodiments, connecting the first power source 230 or the second power source 240 to the one or more loads 250 by transmitting a second set of control signals to the switching device 200 further includes controlling a switching operation of a first semiconductor device pair 210 and a second semiconductor device pair 220 to connect the one or more loads 250 to the isolated first power source 230 or the isolated second power source 240 in response to the second set of control signals. In some embodiments, the second set of control signals is configured to operate the switching device 200 in a grid-tied switching mode. In some embodiments, the method 500 further includes connecting the one or more loads 250 to an isolated first power source 230 or isolated second power source 240 by operating the first semiconductor device pair 210 and the second semiconductor device pair 220 in response to the second set of control signals. In some embodiments, the method 500 further includes aligning the switching device 200 to connect the second power source 240 to the first power source 230 and the one or more loads 250 to transfer an excess power to the first power source 230. The excess power can include power generated by the second power source 240 and transmitted to the one or more loads 250, and which exceeds a requirement of the one or more loads 250. Consequently, in some embodiments, the controller 280 may be configured to control the first semiconductor device pair 210 and the second semiconductor device pair 220 to align the second power source 240 to the one or more loads 250 and the first power source 230 to allow the power that exceeds the requirement of the one or more loads 250 to be transferred to the first power source 230.

In some embodiments, the second set of signals may include the voltage, frequency, and/or phase angle of the first power source 230 and the second power source 240. Consequently, in some embodiments, the method 500 may further include determining the voltage, frequency, and/or phase of the first power source 230 and the second power source 240 is in/out of sync with the other of the first power source 230 and the second power source 240. In some embodiments, each of the first set of electronic signals and the second set of electronic signals comprises the voltage, frequency, and/or phase angle of the first power source 230 and the second power source 240. In some embodiments, the isolated first power source 230 or second power source 240 is connected to the one or more loads 250 and the other of the first power source 230 and the second power source 240 when the voltage, frequency, and/or phase angle of the isolated power source is within a predetermined range of the voltage, frequency, and/or phase angle of the other power source. In some embodiments, the second signal may further include a vibration, a temperature, and other like signals which may indicate a condition of the first power source 230 and the second power source 240.

In some embodiments, the method 500 may further include aligning a first semiconductor device pair 210 and a second semiconductor device pair 220 of the switching device 200 to connect the second power source 240 to the one or more loads and the first power source 230. In some embodiments, the first power source 230 can receive power from the second power source 240 that exceeds a requirement of the one or more loads 250.

In some embodiments, the switching device 200 may further include one or more switches 260. In some embodiments, the method 500 further includes operating each of the one or more switches 260 to connect or disconnect the first power source 230 and the second power source 240 from the one or more loads 250.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "grid" refers to a utility power grid such as a public utility grid coming from a utility sub-station. The term "grid" can also refer to a macro-grid. The grid can provide AC power or DC power. Further, the utility grid can include systems capable of AC/DC and DC/AC conversion. The grid can include any of a plurality of voltages and can include one or more phases. For example, the utility grid can include 480 V/60 Hz 3-phase AC power.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

disposed directly between both of the two other structural elements such that the particular structural component is in direct contact with both of the two other structural elements;

disposed directly next to only one of the two other structural elements such that the particular structural component is in direct contact with only one of the two other structural elements;

disposed indirectly next to only one of the two other structural elements such that the particular structural component is not in direct contact with only one of the two other structural elements, and there is another element which juxtaposes the particular structural component and the one of the two other structural elements;

disposed indirectly between both of the two other structural elements such that the particular structural component is not in direct contact with both of the two other structural elements, and other features can be disposed therebetween; or any combination(s) thereof.

As used herein "embedded" means that a first material is distributed throughout a second material.

ASPECTS

Various Aspects are described below. It is to be understood that any one or more of the features recited in the following Aspect(s) can be combined with any one or more other Aspect(s).

Aspect 1. A system comprising: a switching device configured to connect one or more loads to a first power source and a second power source, the switching device including: a first semiconductor device pair, a second semiconductor device pair, and a controller electrically communicable with the switching device and configured to: receive a first set of electronic signals corresponding to a condition of the first power source and the second power source, isolate the first power source or the second power source from the one or more loads by transmitting a first set of control signals to the switching device, the first set of control signals based on determining a fault condition at either the first power source or the second power source, receive a second set of electronic signals corresponding to the condition of the first power source and the second power source, and connect the first power source or the second power source to the one or more loads by transmitting a second set of control signals to the switching device, the second set of control signals based on determining a clearing of the fault condition at the first power source or the second power source.

Aspect 2. The system according to aspect 1, wherein isolating the first power source or the second power source from the one or more loads by transmitting a first set of control signals to the switching device further comprises: control a switching operation of the first semiconductor device pair and the second semiconductor device pair to isolate the one or more loads from the first power source or the second power source in response to the first set of control signals, wherein the first set of control signals is configured to operate the switching device in a static transfer switching mode.

Aspect 3. The system according to any one of aspects 1 or 2, wherein connecting the first power source or the second power source to the one or more loads by transmitting a second set of control signals to the switching device further comprises: control a switching operation of the first semiconductor device pair and the second semiconductor device pair to connect the one or more loads to the isolated first power source or isolated second power source in response to the second set of control signals; wherein the second set of control signals is configured to operate the switching device in a grid-tied switching mode.

Aspect 4. The system according to any one of aspects 1, 2, or 3, wherein each of the first set of electronic signals and the second set of electronic signals comprise a voltage, frequency, and/or phase angle of the first power source and the second power source.

Aspect 5. The system according to aspect 4, wherein the controller is further configured to: determining the voltage, frequency, and/or phase of an isolated first power source or isolated second power source is synchronized with an other of the first power source and second power source, wherein the isolated first power source or isolated second power source is connected to the one or more loads and the other of the first power source and the second power source when the voltage, frequency, and/or phase angle of the isolated first power source or isolated second power source is within a predetermined range of the voltage, frequency, and/or phase angle of the other of the first power source and the second power source.

Aspect 6. The system according to any one of aspects 1, 2, 3, 4, or 5, wherein the controller is further configured to: align the first semiconductor device pair and the second semiconductor device pair to connect the second power source to the one or more loads and the first power source, wherein the first power source receives power from the second power source that exceeds a requirement of the one or more loads.

Aspect 7. The system according to aspects 1, 2, 3, 4, 5, or 6, wherein the first semiconductor device pair comprises a first semiconductor device and a second semiconductor device arranged in an anti-parallel configuration; wherein the second semiconductor device pair comprises a third semiconductor device and a fourth semiconductor device arranged in an anti-parallel configuration.

Aspect 8. The system according to any of aspects 1, 2, 3, 4, 5, 6, or 7, wherein each semiconductor device of the first semiconductor device pair and the second semiconductor device pair comprises a thyristor.

Aspect 9. The system according to any of aspects 1, 2, 3, 4, 5, 6, 7, or 8, wherein the switching device further comprises: one or more switches, wherein the one or more switches are configured to electrically isolate and bypass the first semiconductor device pair and the second semiconductor device pair.

Aspect 10. The system according to aspect 9, wherein the switching device further comprises: a first switch disposed between the first power source and the first semiconductor device pair, a second switch disposed between the second power source and the second semiconductor device pair, and a common node connecting the first semiconductor device pair and the second semiconductor device pair to the one or more loads.

Aspect 11. The system according to aspect 10, wherein the switching device further comprises: a third switch disposed between the common node and the one or more loads, a fourth switch disposed between the common node and the one or more loads parallel to the third switch, a fifth switch disposed between the first power source and the one or more loads, and a sixth switch disposed between the second power source and the one or more loads.

Aspect 12. A method comprising: receiving, by a controller, a first set of electronic signals corresponding to a condition of a first power source and a second power source; isolating, by a controller, the first power source or the second power source from one or more loads by transmitting a first set of control signals to a switching device, the first set of control signals based on determining a fault condition at either the first power source or the second power source; receiving, by a controller, a second set of electronic signals corresponding to the condition of the first power source and the second power source; and connecting, by a controller, the first power source or the second power source to the one or more loads by transmitting a second set of control signals to the switching device, the second set of control signals based on determining a clearing of the fault condition at the first power source or the second power source.

Aspect 13. The method according to aspect 12, wherein isolating, by a controller, the first power source or the second power source from the one or more loads by transmitting a first set of control signals to the switching device further comprises: controlling, by the controller, a switching operation of a first semiconductor device pair and a second semiconductor device pair to isolate the one or more loads from the first power source or the second power source in response to the first set of control signals, wherein the first set of control signals is configured to operate the switching device in a static transfer switching mode.

Aspect 14. The method according to any of aspects 12 or 13, wherein connecting, by a controller, the first power source or the second power source to the one or more loads by transmitting a second set of control signals to the switching device further comprises: controlling, by the controller, a switching operation of a first semiconductor device pair and a second semiconductor device pair to connect the one or more loads to an isolated first power source or isolated second power source in response to the second set of control signals, wherein the second set of control signals is configured to operate the switching device in a grid-tied switching mode.

Aspect 15. The method according to any of aspects 12, 13, or 14, further comprising: determining a voltage, frequency, and/or phase of an isolated first power source or isolated second power source is synchronized with an other of the first power source and second power source; and wherein each of the first set of electronic signals and the second set of electronic signals comprises the voltage, frequency, and/or phase angle of the first power source and the second power source; wherein the isolated first power source or isolated second power source is connected to the one or more loads and the other of the first power source and the second power source when the voltage, frequency, and/or phase angle of the isolated power source is within a predetermined range of the voltage, frequency, and/or phase angle of the other power source.

Aspect 16. The method according to any of aspects 12, 13, 14, or 15, further comprising: aligning, by the controller, a first semiconductor device pair and a second semiconductor device pair of the switching device to connect the second power source to the one or more loads and the first power source; wherein the first power source receives power from the second power source that exceeds a requirement of the one or more loads.

Aspect 17. A controller electrically communicable with a switching device, the switching device including a first semiconductor device pair and a second semiconductor device pair, the controller comprising a processor configured to: receive a first set of electronic signals corresponding to a condition of a first power source and a second power source; isolate the first power source or the second power source from one or more loads by transmitting a first set of control signals to the switching device, the first set of control signals based on determining a fault condition at either the first power source or the second power source; receive a second set of electronic signals corresponding to the condition of the first power source and the second power source; connect the first power source or the second power source to the one or more loads by transmitting a second set of control signals to the switching device, the second set of control signals based on determining a clearing of the fault condition at the first power source or the second power source; and wherein each of the first set of electronic signals and the second set of electronic signals comprise a voltage, frequency, and/or phase angle of the first power source and the second power source; wherein an isolated first power source or isolated second power source is connected to the one or more loads and an other of the first power source and the second power source when the voltage, frequency, and/or phase angle of the isolated first power source or isolated second power source is within a predetermined range of the voltage, frequency, and/or phase angle of the other of the first power source and the second power source.

Aspect 18. The controller according to aspect 17, wherein the controller is further configured to: control a switching operation of the first semiconductor device pair and the second semiconductor device pair to isolate the one or more loads from the first power source or the second power source in response to the first set of control signals, wherein the first set of control signals is configured to operate the switching device in a static transfer switching mode.

Aspect 19. The controller according to any of aspects 17 or 18, wherein the controller is further configured to: control a switching operation of the first semiconductor device pair and the second semiconductor device pair to connect the one or more loads to the isolated first power source or isolated second power source in response to the second set of control signals; wherein the second set of control signals is configured to operate the switching device in a grid-tied switching mode.

Aspect 20. The controller according to any of aspects 17, 18, or 19, wherein the controller is further configured to: align the first semiconductor device pair and the second semiconductor device pair to connect the second power source to the one or more loads and the first power source, wherein the first power source receives power from the second power source that exceeds a requirement of the one or more loads.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A system comprising:
 a switching device configured to connect one or more loads to a first power source and a second power source, the switching device including:
  a first semiconductor device pair, and
  a second semiconductor device pair, and
 a controller electrically communicable with the switching device and configured to:
  receive a first set of electronic signals corresponding to a condition of the first power source and the second power source,
  isolate one of the first power source and the second power source from the one or more loads by transmitting a first set of control signals to the switching device to control the first semiconductor device pair and the second semiconductor device pair, the first set of control signals being based on determining a fault condition at either the first power source or the second power source,
  receive a second set of electronic signals corresponding to the condition of the first power source and the second power source,
  determine, based on the second set of electronic signals, a voltage, frequency, and/or phase of the isolated first power source or the isolated second power source is synchronized with an other of the first power source and the second power source, and
  connect the isolated first power source or the isolated second power source to the one or more loads by transmitting a second set of control signals to the switching device to control the first semiconductor device pair and the second semiconductor device pair, the second set of control signals being based on determining a clearing of the fault condition at the isolated first power source or the isolated second power source,
  wherein each of the first set of electronic signals and the second set of electronic signals comprise the voltage, frequency, and/or phase angle of the first power source and the second power source,
  wherein the isolated first power source or isolated second power source is connected to the one or more loads and the other of the first power source and the second power source when the voltage, frequency, and/or phase angle of the isolated first power source or isolated second power source is within a predetermined range of the voltage, frequency, and/or phase angle of the other of the first power source and the second power source; and
 wherein the controller is configured to operate the switching device in a grid-tied switching mode to simultaneously connect the one or more electrical loads to the first power source and the second power source;
 wherein the first power source is a grid power source and the second power source is a distributed generation power source, and the grid power source, when connected to the distributed generation power source, is configured to receive power from the distributed generation power source that exceeds a requirement of the one or more loads.

2. The system according to claim 1, wherein isolating the first power source or the second power source from the one or more loads by transmitting the first set of control signals to the switching device further comprises:
 control a switching operation of the first semiconductor device pair and the second semiconductor device pair to isolate the one or more loads from the first power source or the second power source in response to the first set of control signals, wherein the first set of control signals is configured to operate the switching device in a static transfer switching mode.

3. The system according to claim 1, wherein connecting the first power source or the second power source to the one or more loads by transmitting the second set of control signals to the switching device further comprises:

control a switching operation of the first semiconductor device pair and the second semiconductor device pair to connect the one or more loads to the isolated first power source or isolated second power source in response to the second set of control signals;

wherein the second set of control signals is configured to operate the switching device in the grid-tied switching mode.

4. The system according to claim 1, wherein the controller is further configured to:

align the first semiconductor device pair and the second semiconductor device pair to connect the second power source to the one or more loads and the first power source.

5. The system according to claim 1, wherein the first semiconductor device pair comprises a first semiconductor device and a second semiconductor device arranged in an anti-parallel configuration;

wherein the second semiconductor device pair comprises a third semiconductor device and a fourth semiconductor device arranged in an anti-parallel configuration.

6. The system according to claim 1, wherein each semiconductor device of the first semiconductor device pair and the second semiconductor device pair comprises a thyristor.

7. The system according to claim 1, wherein the switching device further comprises:

one or more switches,
wherein the one or more switches are configured to electrically isolate and bypass the first semiconductor device pair and the second semiconductor device pair.

8. The system according to claim 7, wherein the one or more switches at the switching device further comprises:

a first switch disposed between the first power source and the first semiconductor device pair,
a second switch disposed between the second power source and the second semiconductor device pair, and
a common node connecting the first semiconductor device pair and the second semiconductor device pair to the one or more loads.

9. The system according to claim 8, wherein the one or more switches at the switching device further comprises:

a third switch disposed between the common node and the one or more loads,
a fourth switch disposed between the common node and the one or more loads parallel to the third switch,
a fifth switch disposed between the first power source and the one or more loads, and
a sixth switch disposed between the second power source and the one or more loads.

10. A method comprising:

receiving, by a controller, a first set of electronic signals corresponding to a condition of a first power source and a second power source;
isolating, by the controller, one of the first power source and the second power source from one or more loads by transmitting a first set of control signals to a switching device, the first set of control signals based on determining a fault condition at either the first power source or the second power source;
receiving, by the controller, a second set of electronic signals corresponding to the condition of the first power source and the second power source; and
determining, by the controller, a voltage, frequency, and/or phase of an isolated first power source or isolated second power source is synchronized with an other of the first power source and the second power source;
connecting, by the controller, the isolated first power source or the isolated second power source to the one or more loads by transmitting a second set of control signals to the switching device, the second set of control signals based on determining a clearing of the fault condition at the isolated first power source or the isolated second power source;
wherein each of the first set of electronic signals and the second set of electronic signals comprises the voltage, frequency, and/or phase angle of the first power source and the second power source;
wherein the isolated first power source or the isolated second power source is connected to the one or more loads and the other of the first power source and the second power source when the voltage, frequency, and/or phase angle of the isolated first power source or the isolated second power source is within a predetermined range of the voltage, frequency, and/or phase angle of the other of the first power source and the second power source; and
wherein the controller is further configured to operate the switching device in a grid-tied switching mode to simultaneously connect the one or more loads to the first power source and the second power source;
wherein the first power source is a grid power source and the second power source is a distributed generation power source, and the grid power source, when connected to the distributed generation power source, is configured to receive power from the distributed generation power source that exceeds a requirement of the one or more loads.

11. The method according to claim 10, wherein isolating, by the controller, the first power source or the second power source from the one or more loads by transmitting the first set of control signals to the switching device further comprises:

controlling, by the controller, a switching operation of a first semiconductor device pair and a second semiconductor device pair to isolate the one or more loads from the first power source or the second power source in response to the first set of control signals,
wherein the first set of control signals is configured to operate the switching device in a static transfer switching mode.

12. The method according to claim 10, wherein connecting, by the controller, the first power source or the second power source to the one or more loads by transmitting the second set of control signals to the switching device further comprises:

controlling, by the controller, a switching operation of a first semiconductor device pair and a second semiconductor device pair to connect the one or more loads to the isolated first power source or the isolated second power source in response to the second set of control signals, wherein the second set of control signals is configured to operate the switching device in the grid-tied switching mode.

13. The method according to claim 10, further comprising:
aligning, by the controller, a first semiconductor device pair and a second semiconductor device pair of the switching device to connect the second power source to the one or more loads and the first power source.

14. A controller electrically communicable with a switching device, the switching device including a first semiconductor device pair and a second semiconductor device pair, the controller comprising a processor configured to:
receive a first set of electronic signals corresponding to a condition of a first power source and a second power source;
isolate one of the first power source and the second power source from one or more loads by transmitting a first set of control signals to the switching device, the first set of control signals based on determining a fault condition at either the first power source or the second power source;
receive a second set of electronic signals corresponding to the condition of the first power source and the second power source;
determine a voltage, frequency, and/or phase of an isolated first power source or isolated second power source is synchronized with an other of the first power source and the second power source;
connect the isolated first power source or the isolated second power source to the one or more loads by transmitting a second set of control signals to the switching device, the second set of control signals based on determining a clearing of the fault condition at the isolated first power source or the isolated second power source; and
wherein each of the first set of electronic signals and the second set of electronic signals comprise the voltage, frequency, and/or phase angle of the first power source and the second power source;
wherein the isolated first power source or the isolated second power source is connected to the one or more loads and an other of the first power source and the second power source when the voltage, frequency, and/or phase angle of the isolated first power source or isolated second power source is within a predetermined range of the voltage, frequency, and/or phase angle of the other of the first power source and the second power source; and
wherein the controller is further configured to operate the switching device in a grid-tied switching mode to simultaneously connect the one or more electrical loads to the first power source and the second power source;
wherein the first power source is a grid power source and the second power source is a distributed generation power source, and the grid power source, when connected to the distributed generation power source, is configured to receive power from the distributed generation power source that exceeds a requirement of the one or more loads.

15. The controller according to claim 14, wherein the controller is further configured to:
control a switching operation of the first semiconductor device pair and the second semiconductor device pair to isolate the one or more loads from the first power source or the second power source in response to the first set of control signals,
wherein the first set of control signals is configured to operate the switching device in a static transfer switching mode.

16. The controller according to claim 14, wherein the controller is further configured to:
control a switching operation of the first semiconductor device pair and the second semiconductor device pair to connect the one or more loads to the isolated first power source or the isolated second power source in response to the second set of control signals;
wherein the second set of control signals is configured to operate the switching device in the grid-tied switching mode.

17. The controller according to claim 14, wherein the controller is further configured to:
align the first semiconductor device pair and the second semiconductor device pair to connect the second power source to the one or more loads and the first power source.

* * * * *